June 3, 1958 R. CHELMINSKI 2,837,215
FLEXIBLE DRIVE
Filed May 21, 1954 5 Sheets-Sheet 3
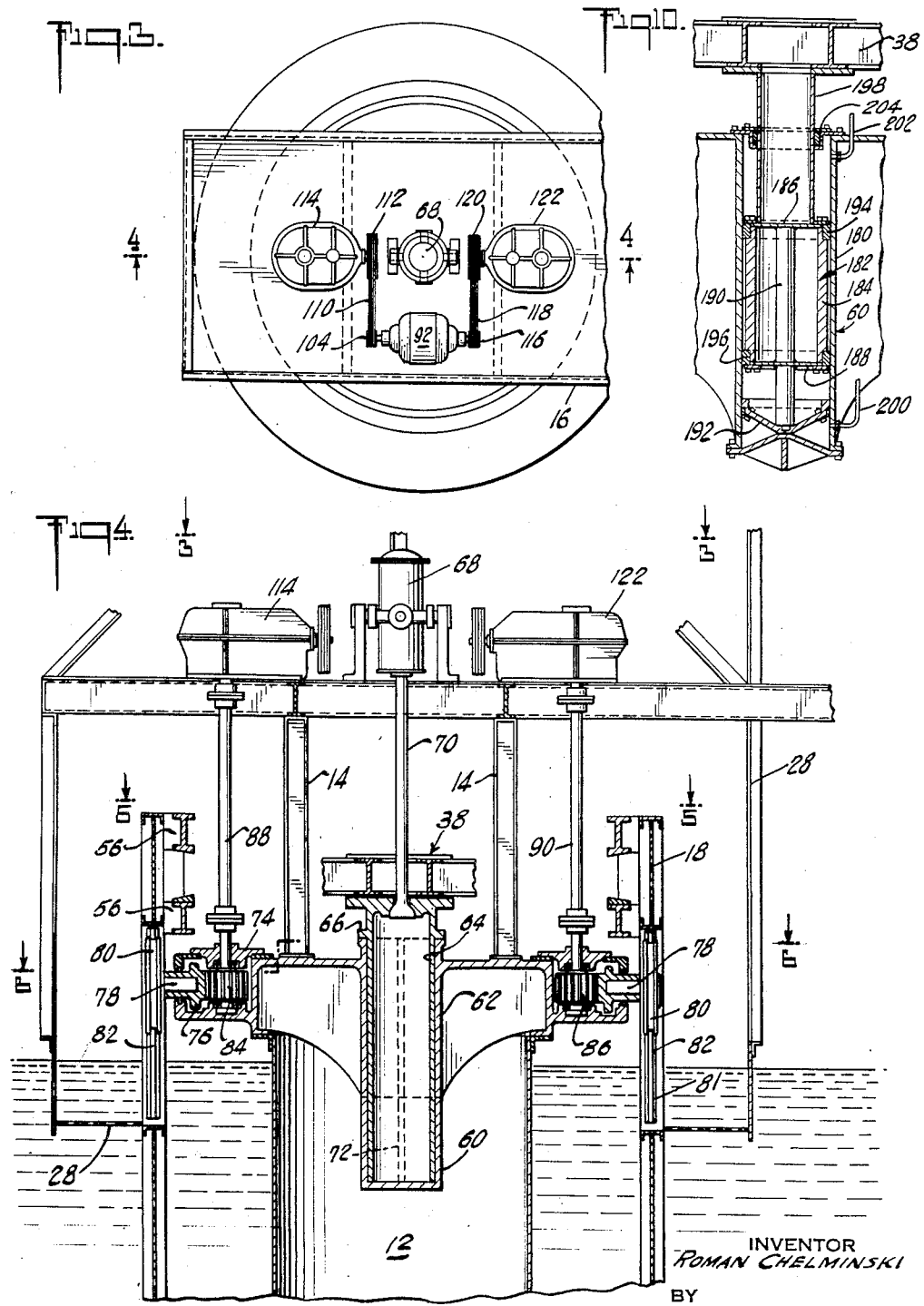
INVENTOR
ROMAN CHELMINSKI
BY
Curtis, Morris & Safford.
ATTORNEYS

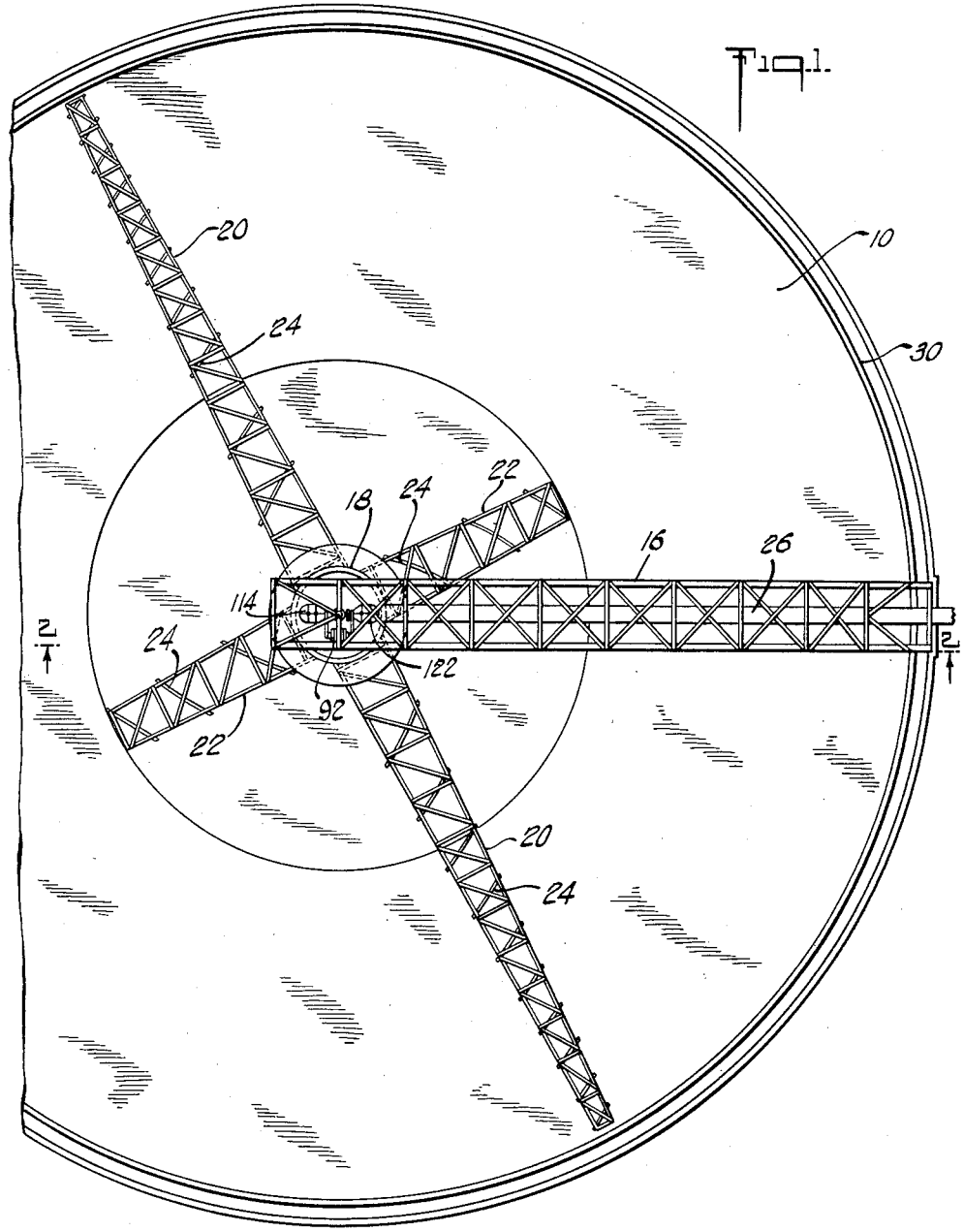

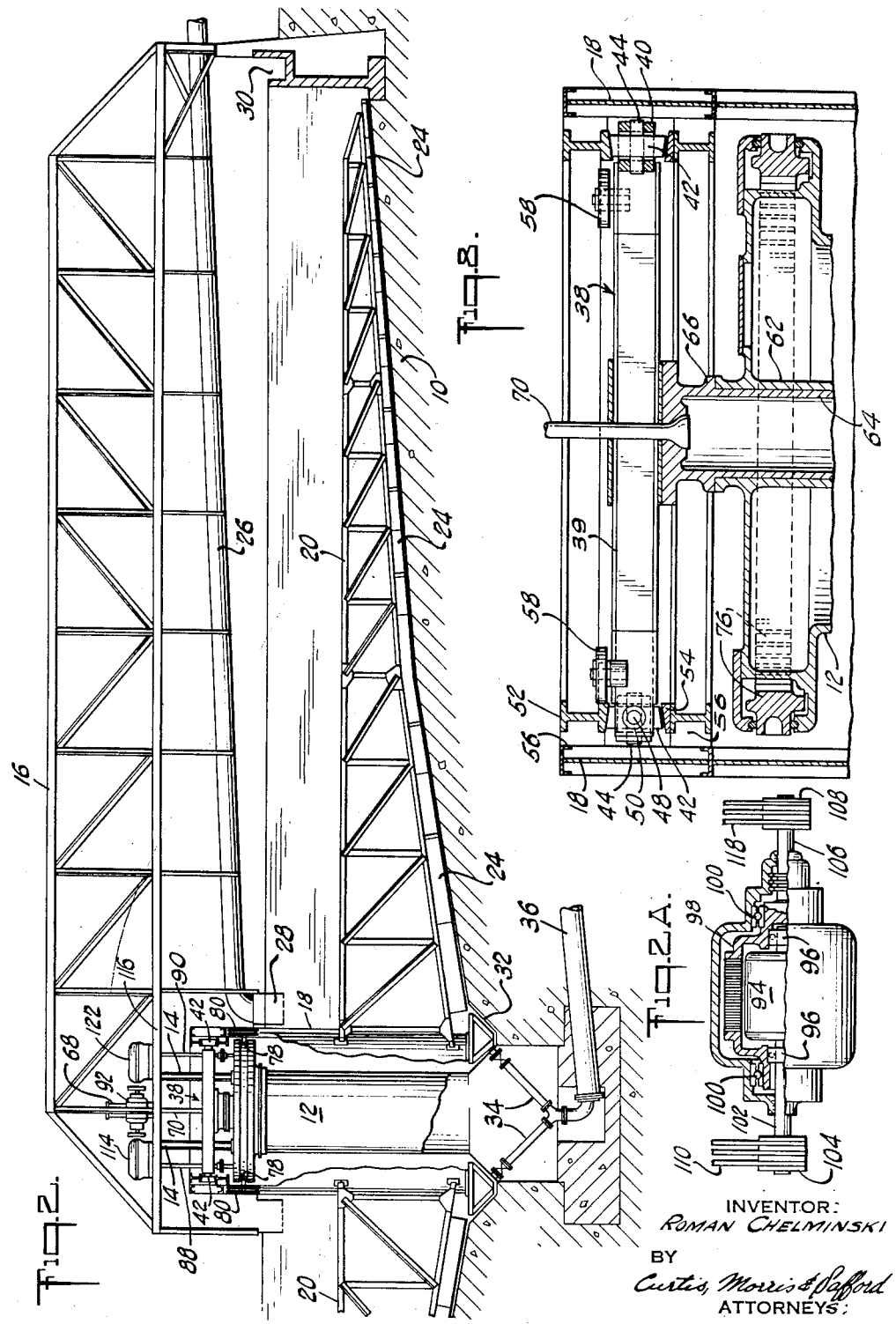

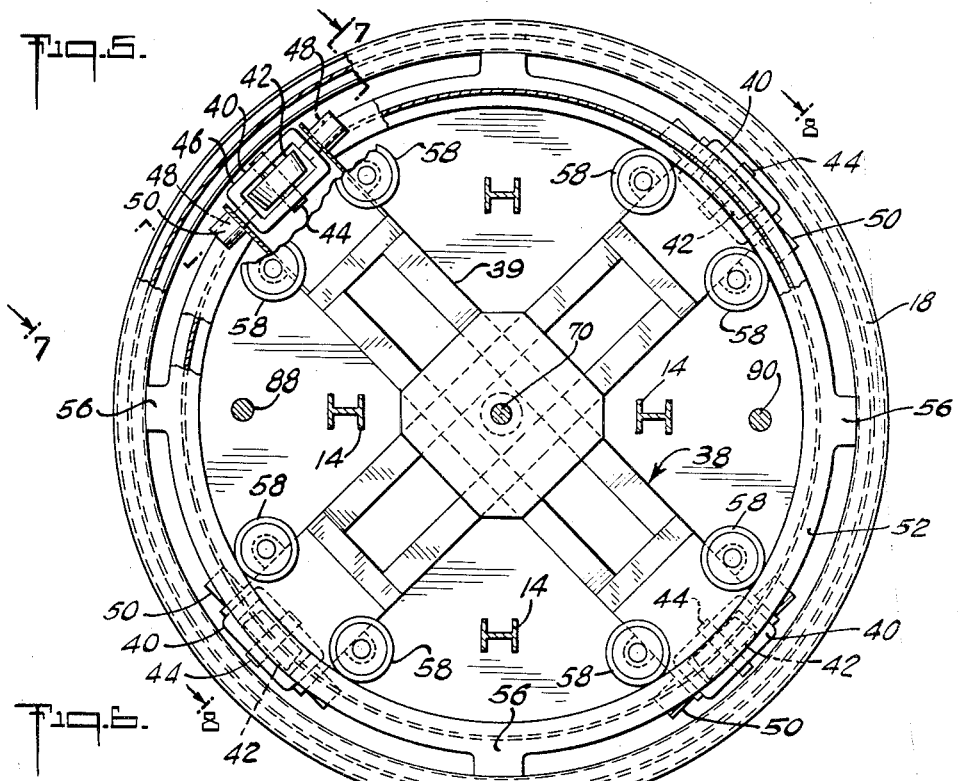
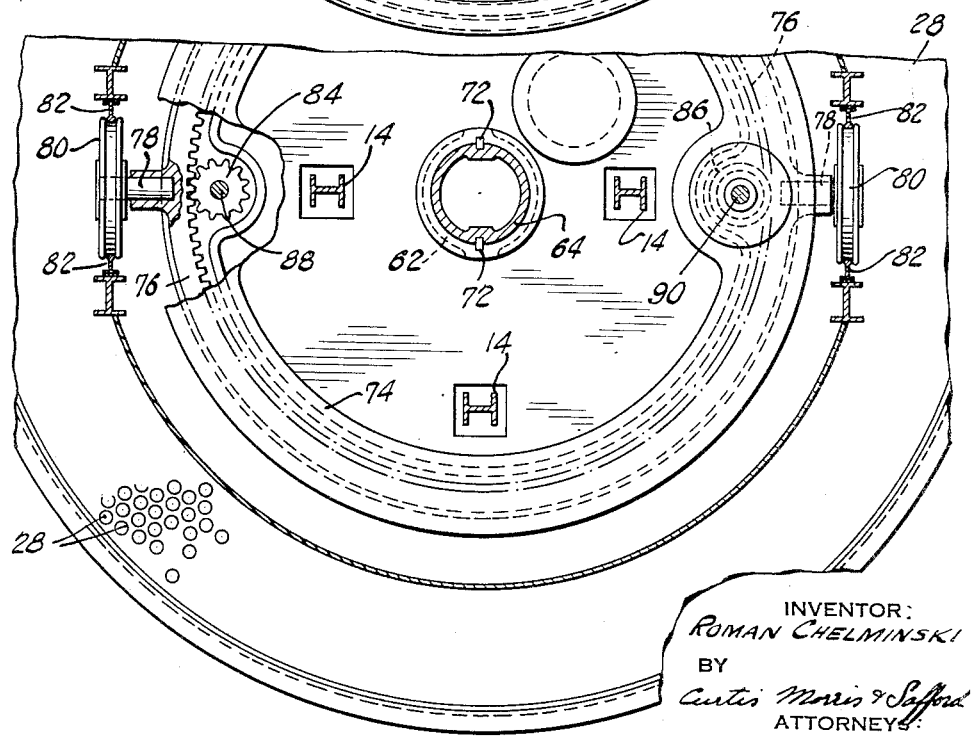

June 3, 1958
R. CHELMINSKI
2,837,215
FLEXIBLE DRIVE
Filed May 21, 1954
5 Sheets-Sheet 5
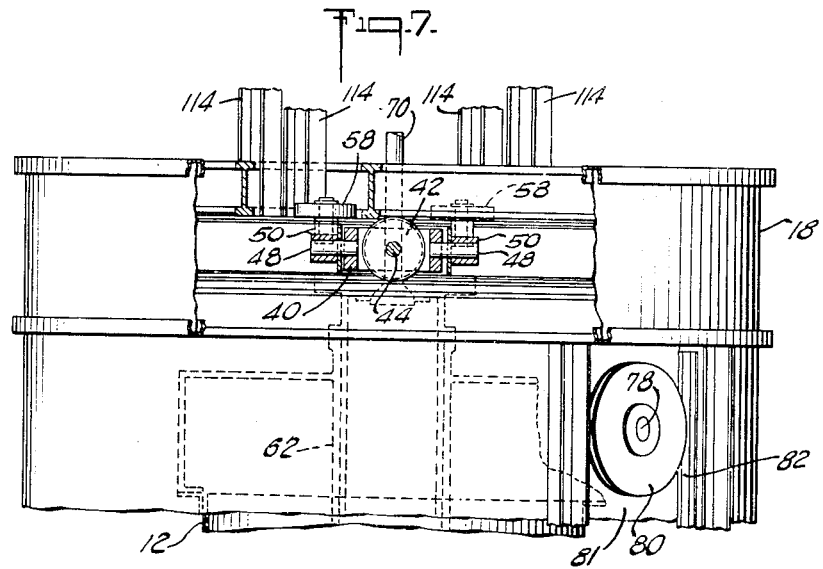
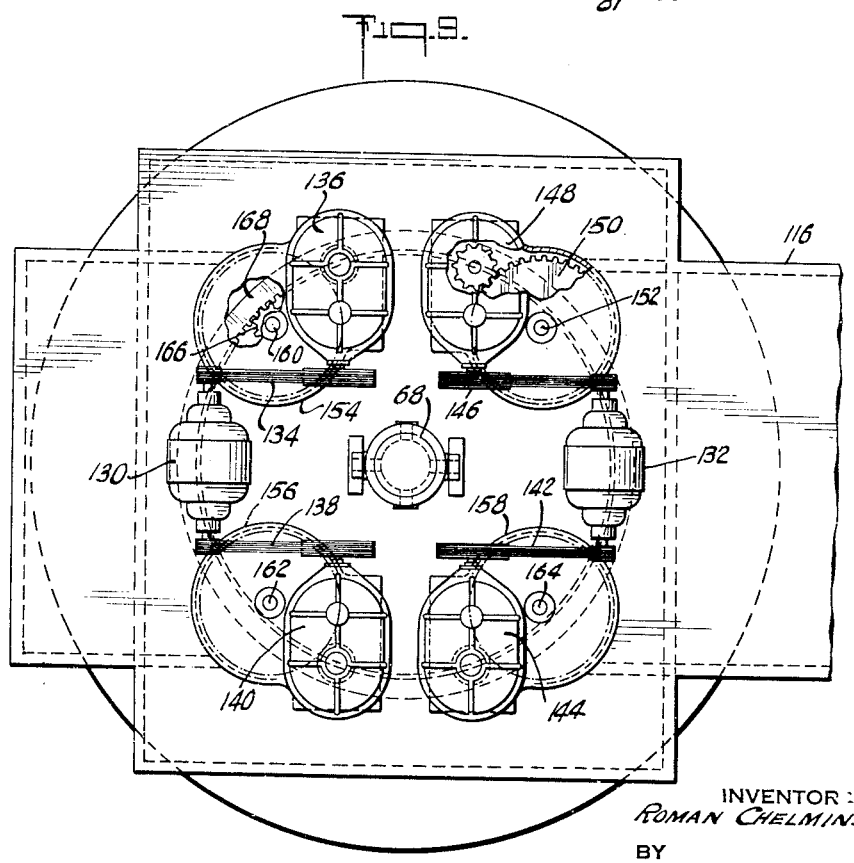
INVENTOR:
ROMAN CHELMINSKI.
BY
Curtis, Morris & Safford.
ATTORNEYS.

# United States Patent Office 2,837,215
Patented June 3, 1958

2,837,215

FLEXIBLE DRIVE

Roman Chelminski, Wilton, Conn., assignor to Knowles Associates, New York, N. Y., a copartnership consisting of Chester L. Knowles and Roman Chelminski Application May 21, 1954, Serial No. 431,356

7 Claims. (Cl. 210—531)

This invention relates to sedimentation apparatus of the type commonly called a thickener or hydroseparator, and more particularly to an improved driving and lifting means for the central drum and associated rake arms of such sedimentation apparatus.

Sedimentation apparatus of the type referred to commonly comprises a relatively large diameter tank to which a suspension to be settled is fed and a rotatable central drum on which outwardly extending arms are mounted that support a series of rakes which cooperate with the bottom of the tank as the arms are rotated to rake settled solids toward the center of the tank for discharge therefrom. It has been found in the operation of such settling tanks that the settled solids sometimes accumulate to the point where an excessive driving torque is required to rotate the rake arms and accordingly such apparatus commonly includes means for raising the central drum and rake arms while continuing to rotate them until the excessive resistance to rake arm movement has been overcome.

Since such settling tanks are of relatively large diameter long rake arms are required to reach the periphery of the tank and a large driving torque is required to move the rake arms. The driving mechanism for the rake structure commonly comprises a large diameter horizontally disposed "bull" gear which is connected near its periphery to the rake arm drum and which is driven by a suitable prime mover that is connected to a plurality of driving points spaced around the periphery of the bull gear. The rake-carrying drum is so supported that it can be selectively raised, e. g. by hydraulic lifting means, while remaining mechanically connected to the bull gear by which it is driven.

It has been found that in the operation of such structures a number of difficulties are likely to be encountered. As indicated above, the bull gear is ordinarily driven from a number of different points spaced around its periphery and it is important that the driving torque be equally distributed among the various driving points, since unequal distribution of the torque produces unequal strains on the gear teeth of the bull gear and consequent breakage of the more heavily loaded teeth. Moreover, because of the large driving torque required it is important that the rake-carrying drum, the lifting frame and the bull gear be concentric within close limits, since eccentricity of these parts produces severe asymmetrical strains in the apparatus.

It is accordingly an object of the present invention to provide an improved driving and lifting means for the rake carrying arms of a thickener of the type referred to above. It is another object of the invention to provide means for supplying driving power to spaced points on a periphery of the bull gear of such a thickener in such a way that the driving force is substantially equally distributed among the points at which it is supplied to the bull gear. It is another object of the invention to provide a means for maintaining the rake-carrying drum, lifting frame and bull gear of such a thickener in relatively precise concentric relation. It is a further object of the invention to provide a driving and lifting assembly for such a thickener wherein the rake-carrying drum is supported near the top thereof. It is a still further object of the invention to provide a driving and lifting assembly for a thickener which is simpler and more compact than the structures previously available. Other objects of the invention will be in part obvious and in part pointed out hereafter.

In accordance with the present invention an improved thickener drive is achieved by utilizing one or more differential electric motors with the stator and rotor of each motor being connected to spaced points on the main drive gear so that the torques applied to the two spaced driving locations connected to each motor are automatically equalized. By using such a differential motor drive, the complex differential gearing previously used can be eliminated, and the main drive gear can be mounted below the rake-drum-lifting frame with the hydraulic lifting cylinder located at the center of and within the perimeter of the drive gear, thereby providing a more compact structure and more accurate centering of the rake-lifting parts.

The many objects and advantages of the present invention can best be understood and appreciated by reference to the accompanying drawings which illustrate thickeners incorporating a preferred embodiment of the present invention and two modifications thereof. In the drawings:

Fig. 1 is a top plan view of the thickener showing the general arrangement of the rake arms and central driving drum therein;

Fig. 2 is a vertical section taken on the line 2—2 of Fig. 1 and showing the driving mechanism and its supporting pier in elevation. In Fig. 2 the longer rake arms of Fig. 1 have been rotated so that they appear in elevation in Fig. 2;

Fig. 2a is an elevation view of the electric motor used to drive the rake-supporting drum and shows the motor partially in section to illustrate the fact that the stator as well as the rotor is rotatable;

Fig. 3 is a top plan view of the center of thickener particularly showing the driving motor and its associated reduction gearing;

Fig. 4 is a vertical section taken on the line 4—4 of Fig. 3 and showing the rake arm supporting drum and the apparatus for driving and lifting the drum;

Fig. 5 is an enlarged horizontal section taken on the line 5—5 of Fig. 4 and particularly showing the lifting frame for lifting the rake arm supporting drum;

Fig. 6 is a partial horizontal section on the line 6—6 of Fig. 4, broken away to show a portion of the bull gear and one of its driving pinions as well as the driving wheels that are secured to the bull gear and drive the rake arm supporting drum;

Fig. 7 is a side elevation of the top portion of the drum taken as viewed from the location of line 7—7 of Fig. 5 and broken away to show the mounting of one of the drum supporting wheels;

Fig. 8 is a vertical section taken on the line 8—8 of Fig. 5 and showing the structure that supports the drum;

Fig. 9 is a top plan view of a modified form of drive wherein two differential motors are used; and Fig. 10 is a fragmentary central vertical section showing a modification wherein the hydraulic lifting means is incorporated in the central cavity of the supporting pier.

Referring to the drawing and more particularly to Figures 1 and 2, the thickener there shown comprises generally a large diameter relatively shallow concrete tank 10 having at its center a vertical pier 12 which supports, through the vertical columns 14, one end of a frame or superstructure 16 that extends from the center of the tank to the periphery thereof. Mounted on the pier 12 for rotation with respect thereto is a drum 18 which supports two pairs of rake-carrying arms 20 and 22. As shown in Fig. 1 the arms 20 extend substantially to the periphery of the tank 10 whereas the arms 22, which are arranged at right-angles to the arms 20, extend only to an intermediate point in the tank. Each of the rake arms is provided with a series of diagonally arranged blades 24 that are positioned close to the bottom of tank 10, and the rake arms are rotated clockwise (as viewed in Fig. 1) to cause the blades 24 to rake settled solids toward the center of the tank.

The superstructure 16 supports a feed pipe 26 through which the suspension to be settled is pumped to the tank. The feed pipe 26 empties into an annular trough 28 having a perforated bottom through which the feed suspension flows to the main body of liquid in the tank. The flow of suspension is generally from the center of the tank to the periphery thereof, and as this flow occurs solids settle to the bottom of the tank and the clear supernatant liquid or liquid carrying the more finely divided solids flows into a channel 30 at the periphery of the tank. The settled solids are moved by the rakes 24 toward the center of the tank and into an annular trough 32 from which they are removed through branch pipes 34 and discharge pipe 36.

Referring now to Figures 4, 5, 7 and 8 and more particularly to Figure 5, the drum 18 is supported at its top by a lifting frame generally designated 38. The frame 38 comprises a cruciform structural member having mounted at the outer end of each of its four arms a roller assembly 40. Each roller assembly (see also Fig. 7) comprises a roller 42 on a shaft 44 by means of which it is mounted for rotation in a rectangular yoke 46. At its opposite ends the yoke 46 is provided with stub shafts 48 that extend into bearings 50 secured to the cruciform structural member 39. Thus the rollers 42 are both rotatable and tiltable with respect to the lifting frame 38.

Referring now to Figs. 5 and 8, the rollers 42 are interposed between an upper horizontally disposed circular track 52 and lower horizontally disposed circular track 54, which tracks are secured to the drum 18 at four spaced points by the connecting members 56. As best shown in Fig. 8 the bearing surfaces of rollers 42 are tapered inwardly toward the center of the structure and the lower surface of track 52 and upper surface track 54 are correspondingly tapered to maintain drum 18 substantially concentric with its supporting frame 38. The drum 18 is primarily supported through the upper track 52 which rests on the rollers 42; the lower track 54 acts largely as a guide. As indicated above the rollers 42, by virtue of their being mounted in the yokes 46 and tiltable with respect to the frame, permit self-adjustment of the position of the rollers with respect to tracks 52 and 54. Concentricity of drum 18 and frame 38 are further insured by a series of eight guide rollers 58, two of which are rotatably mounted on each arm of the cruciform structural member 39. The guide rollers 58 engage the upper track 52 and help in preventing undesired lateral movement of drum 18.

As pointed out above it is sometimes necessary to raise the drum 18 and rake arms 20 and 22 to free the rakes from an accumulated body of solids and apparatus for effecting this operation will now be described. It is evident that the apparatus just described provides means for supporting the drum 18 and its associated rake arms concentrically on the frame 38 while permitting rotation of the drum with respect to the frame. Referring particularly to Figure 4 the pier 12 is provided near its top with a central cavity 60 having a fixed sleeve or liner 62 that is accurately machined to receive a guide cylinder 64 for reciprocating movement therein. The guide cylinder 64 is provided with an annular shoulder 66 that is positioned to engage the upper end of sleeve 62 to limit downward movement of the guide cylinder into cavity 60. At its upper end the guide cylinder 64 is secured to and supports the frame 38 which in turn supports drum 18 and the rake arms as previously described.

To effect lifting movement of the frame 38 and its associated structure a hydraulic ram 68 is provided which is mounted on the superstructure 16 above the lifting frame and guide cylinder and is connected to the guide cylinder by a shaft 70. The hydraulic ram 68 is of conventional and known type and when supplied with hydraulic pressure fluid exerts an upward force on guide cylinder 64, thereby causing the guide cylinder to move upwardly in liner 62 and carry with it frame 38 drum 18 and the rake arms 20 and 22. As shown in Figure 6 the guide cylinder 64 is keyed to the sleeve 62 by longitudinal keys 72 which prevent rotation of the guide cylinder with respect to pier 12 and thereby prevent rotation of lifting frame 38 with the drum 18.

Still referring to Figure 4 and also to Figure 6, the pier 12 at its top is provided with an annular bearing member 74 that supports a horizontally arranged bull gear 76 which is mounted for rotation in the bearing member 74. At diametrically opposed points on its periphery the bull gear 76 is provided with outwardly extending stub-shafts 78 on which are mounted grooved rollers 80 located in vertical slots 81 of the drum 28 (see also Figure 7). The construction is such that when the bull gear 76 is rotated the grooved rollers 80 engage rails 82 secured to the sides of slots 81 to rotate drum 18 and its associated rake arms. Since the rollers 80 are located in the vertical slots 81 the drum 18 can be lifted by the mechanism described above without being disengaged from the driving mechanism.

The bull gear 76 is provided with internal gear teeth and is driven by means of a pair of diametrically disposed pinions 84 and 86 which are mounted in the bearing member 74 and are in turn driven through the vertical shafts 88 and 90 respectively. As pointed out previously it is important that the driving torque applied to the bull gear be equally distributed between the pinions 84 and 86 and this equal distribution of the torque is achieved in accordance with the present invention by using a differential electric motor as a prime mover.

Referring to Figures 2 and 2a, an electric motor 92 for driving the drum 18 is mounted on the superstructure 16. The internal construction of motor 92 is indicated in Figure 2a of the drawings. By reference to Figure 2a it will be observed that the motor comprises a rotor 94 mounted for rotation in the bearings 96 and a rotatable stator mounted for rotation in the bearings 100. The rotor 94 drives a shaft 102 carrying a pulley 104 and the stator 98 drives a shaft 106 carrying a pulley 108. It is evident that the pulleys 104 and 108 will be driven in opposite directions by differential movement of the rotors 94 and 98 and since it is the reaction between rotor 94 and 98 that produces the differential torque, the torque will be automatically equally distributed between the two pulleys. Differential motors suitable for this type of operation are conventional and well known and hence no further description of the details of motor 92 is deemed necessary.

Referring now to Fig. 3, the pulley 104 of motor 92 is connected by a belt 110 to the pulley 112 of a reduction gear housing 114 which contains a conventional set of speed reducing gears and which delivers the resulting relatively low speed torque to the drive shaft 88 (see Figure 4). In like manner pulley 116 drives shaft 90 through a belt 118, pulley 120 and speed reducing gears 122. In this way the equal and opposite torque developed by the motor 92 are delivered to the drive pinions 84 and 86 and these pinions apply to the bull gear driving forces that are automatically maintained substantially equal.

From the foregoing description it should be apparent that structure embodying the present inventon are capable of achieving the several objectives set forth at the beginning of the present specification. Since the guide cylinder 66 is located at the center of bull gear 76 and since both the sleeve or guide 62 in which the guide cylinder moves and bearing member 74 that supports the bull gear are secured to the pier 12, accurate concentricity of the guide cylinder and bull gear are insured. Moreover, the lifting frame 38 which supports drum 18 is secured to the guide cylinder 66 and the drum 18 is accurately positioned with respect to the lifting frame. Hence concentricity of the drum 18 and guide cylinder 66 are insured for all positions of the lifting device and asymmetric strains on the drive mechanism are avoided. By using the differential motor 92, the driving forces applied at the periphery of the bull gear are substantially equally distributed between the pinions 84 and 86. With the present construction the hydraulic ram 68 can be located on the superstructure 16 where it is readily accessible for inspection and repair rather than at the bottom of the tank as was necessary in certain prior structures. The use of the differential motor permits considerable simplification of the driving mechanism and a more compact structure is provided.

It is of course to be understood that the foregoing description is illustrative only and that numerous changes can be made in the details of the structure described without departing from the spirit of the invention. For example, where the load requirements of the thickener require, more than one differential motor can be connected to the bull gear to drive the drum and associated rake arms. To illustrate the use of more than one motor a modification wherein two motors are used is shown in Figure 9 of the drawings. Referring to Figure 9 two differential induction motors 130 and 132 of identical construction are mounted on the superstructure of the thickener. Motor 130 is connected by a belt 134 to the reducing gear housing 136 and by a belt 138 to the reducing gear housing 140. Motor 132 is connected by a belt 142 to the reducing gear housing 144 and by a belt 146 to the reducing gear housing 148.

In the embodiment shown in Figure 9 an intermediate gear is interposed between each speed reducing train and the bull gear engaging pinion that it drives. Thus the output of the reducing gear train 148 is delivered to an intermediate gear 150 which is secured to drive shaft 152 that extends downwardly to the level of the bull gear. In like manner reduction gear trains 136, 140 and 144 are connected to intermediate gears 154, 156 and 158 respectively that are mounted for rotation on shafts 160, 162 and 164 respectively. As illustrated in Figure 9 shaft 160 at its lower end is provided with a pinion 166 that is in driving engagement with the bull gear 168 in the same manner that pinion 84 engages bull gear 76. The shafts 152, 162 and 164 are similarly provided with driving pinions that engage the bull gear 168 and the four pinions are equally spaced around the periphery of the bull gear. Since the induction motors 130 and 132 are of identical construction, they will automatically assume substantially equal shares of the total load. Moreover, as explained above the pair of pinions driven by each motor will equally divide the portion of the load assumed by that motor because of the differential effect of the rotating stator and rotor. Hence the driving torque applied to the bull gear is equally distributed among the several pinions that drive it. It is evident that with the present construction one or several differential motors can be used as desired and hence the structure is adapted to be used with a relatively wide range of thickener sizes.

Turning now to Figure 10 of the drawings, a modification is there shown wherein the hydraulic lifting means for the frame 38 is located in the pier 12 instead of on top of the superstructure 16 as shown in Figure 4. In the modification of Figure 10, the cavity 60 is provided with a liner 180 in which there is a vertically moveable piston 182 which comprises a guide cylinder 184 having top and bottom closure plates 186 and 188 respectively. Extending through the guide cylinder 184 there is a rod 190 that is secured to the top closure plate 186 and extends downwardly through the bottom closure plate 188. Secured to the lower end of rod 190 there is a piston head 192 that fits snugly in the liner 180 and forms part of the piston 180. The upper and lower ends of the guide cylinder are provided with annular bushings 194 and 196 that bear against the interior of liner 180.

Connected to the top of guide cylinder 184 there is a cylindrical support 198 that is secured to the frame 38. Thus vertical movement of the piston 182 raises and lowers the lifting frame as well as its associated drum and rakes.

To raise the piston 182 hydraulic liquid under pressure is supplied to the cavity 60 below piston head 192 through a pipe 200. In normal operation a small amount of the hydraulic liquid leaks around the piston 182 and hence a liquid return pipe 202 is provided near the top of liner 180 to return such leakage liquid to its reservoir. A seal plate 204 is secured to the top of liner 180 to prevent escape of hydraulic liquid from cavity 60. It is evident that the location of the hydraulic lifting means in the cavity 60 rather than on top of the superstructure 16 provides an exceptionally compact arrangement of the parts.

Other modifications within the scope of the invention will be apparent to those skilled in the art.

I claim:

1. In sedimentation apparatus of the type in which a centrally driven rake-carrying drum is rotated in a tank containing a suspension to be settled, driving means for driving said rake-carrying drum comprising in combination a plurality of electric motors each having a rotatable stator and rotor that cooperates to produce a differential torque, a bull gear mechanically connected to said frame to rotate therewith, a plurality of pairs of pinions positioned to engage said bull gear, said pinions being arranged at substantially equal intervals around the periphery of said bull gear, one pinion of each pair being mechanically connected to the rotatable stator of each of said motors and the other pinion of each pair being mechanically connected to the rotor of the same mtor, whereby the differential torque developed by each motor is automatically substantially equally distributed between the pinions connected to that motor.

2. In a sedimentation tank of the type in which a centrally located, generally cylindrical rotatable drum supports a plurality of rake-carrying arms extending outwardly in said tank toward the periphery thereof, driving means for driving said rotatable drum comprising in combination one or more electric motors each having a rotatable stator and rotor that cooperate to produce a differential torque, said motors being mounted on a fixed support above said rotatable frame, a bull gear horizontally arranged within said drum with its periphery close to the inner surface of said drum, said bull gear being mechanically connected to said drum to rotate therewith, one or more pairs of pinions positioned to engage said bull gear, said pinions being arranged at substantially equal intervals around the periphery of said bull gear, one pinion of each pair being mechanically connected to the rotatable stator of one motor and the other pinion of each pair being mechanically connected to the rotor of the same motor, whereby the differential torque developed by each motor is automatically substantially equally distributed between the pinions connected to that motor.

3. In a sedimentation tank of the type in which a centrally located rotatable drum supports a plurality of rake-carrying arms extending outwardly in said tank toward the periphery thereof, means for driving and lifting said drum comprising in combination a fixed support located above said drum, an electric motor mounted on said fixed support and having a rotatable stator and rotor that cooperate to produce a differential torque, a bull gear horizontally arranged within said drum with its periphery close to the inner surface of said drum, said bull gear being mechanically connected to said drum to rotate therewith, a pair of pinions positioned to engage said bull gear at substantially diametrically opposed points thereof, said pinions being connected respectively to the stator and rotor of said motor whereby the differential torque developed by said motor is substantially equally distributed between said pinions, a guide and guide cylinder slidable therein mounted at the center of and extending through said bull gear, said guide and guide cylinder being mounted with their principal axes co-axial with said bull gear, a lifting frame secured to the top of said guide cylinder above said bull gear and mechanically connected to said rotatable drum, and hydraulic motor means mounted on said fixed support and connected to said guide cylinder to lift said lifting frame and thereby raise said rotatable drum and rakes.

4. In a sedimentation tank of the type in which a centrally located rotatable drum supports a plurality of rake-carrying arms extending outwardly in said tank toward the periphery thereof, means for driving and lifting said drum comprising in combination a fixed support located above said drum, an electric motor mounted on said fixed support and having a rotatable stator and rotor that cooperate to produce a differential torque, a bull gear horizontally arranged within said drum with its periphery close to the inner surface of said drum, said drum being provided with vertical slots and said bull gear being provided with driving wheels that engage the sides of the slots of said drum, whereby said drum is vertically movable with respect to said bull gear while remaining in driven engagement therewith, a pair of pinions engaging said bull gear at substantially diametrically opposed points thereof, said pinions being connected respectively to the stator and rotor of said motor whereby the differential torque developed by said motor is substantially equally distributed between said pinions, a guide and guide cylinder slidable therein mounted at the center of and extending through said bull gear, said guide and guide cylinder being mounted with their principal axes co-axial with said bull gear, a lifting frame secured to the top of said guide cylinder above said bull gear; said rotatable frame being provided with track means and said lifting frame with cooperating rollers that engage said track means whereby said rotatable frame is rotatable with respect to said lifting frame and is supported thereby, hydraulic motor means mounted on said fixed support and connected to said piston, said hydraulic means being selectively operable to lift said lifting frame and thereby raise said rotatable drum and rakes.

5. In a sedimentation tank of the type in which a centrally located rotatable drum supports a plurality of rake-carrying arms extending outwardly in said tank toward the periphery thereof, means for driving and lifting said drum comprising in combination, a bull gear mechanically connected to said rotatable drum to rotate therewith, motor means connected to said bull gear to drive said gear to rotate said drum, a guide and guide cylinder slidable therein mounted at the center of and extending through said bull gear, said guide and guide cylinder being mounted with their principal axes co-axial with said bull gear, a lifting frame secured to said guide cylinder above said bull gear and mechanically connected to said rotatable drum, and selectively operable hydraulic means operably associated with said guide cylinder to lift said cylinder and thereby raise said lifting frame, rotatable drum and rakes.

6. In a sedimentation tank of the type in which a centrally located rotatable drum supports a plurality of rake-carrying arms extending outwardly in said tank toward the periphery thereof, means for driving and lifting said drum comprising in combination, a bull gear mechanically connected to said rotatable drum to rotate therewith, motor means connected to said bull gear to drive said gear to rotate said drum, a guide and guide cylinder slidable therein mounted at the center of and extending through said bull gear, said guide and guide cylinder being mounted with their principal axes co-axial with said bull gear, a lifting frame secured to said guide cylinder above said bull gear and mechanically connected to said rotatable drum, and selectively operable hydraulic means connected to supply hydraulic fluid to said guide below said guide cylinder to raise said cylinder and thereby lift said lifting frame, rotatable drum and rakes.

7. In a sedimentation tank of the type in which a centrally located rotatable drum supports a plurality of rake-carrying arms extending outwardly in said tank toward the periphery thereof, means for driving and lifting said drum comprising in combination, a bull gear mechanically connected to said rotatable drum to rotate therewith, motor means connected to said bull gear to drive said gear to rotate said drum, a hydraulic cylinder and piston slidable therein mounted at the center of and extending through said bull gear, said piston and cylinder being mounted with their principal axes co-axial with said bull gear, a lifting frame secured to said piston above said bull gear and mechanically connected to said rotatable drum, and selectively operable hydraulic means connected to said cylinder to supply fluid under pressure thereto to cause said piston to raise said lifting frame, rotatable drum and rakes.

References Cited in the file of this patent

UNITED STATES PATENTS

| | | |
|---|---|---|
| 557,384 | Hassler | Mar. 31, 1896 |
| 822,162 | Stumma | May 29, 1906 |
| 1,321,898 | Dey | Nov. 18, 1919 |
| 1,461,852 | Kasley | July 17, 1923 |
| 1,888,743 | Scott | Nov. 22, 1932 |
| 2,360,817 | Scott | Oct. 17, 1944 |
| 2,404,752 | Schoenfeld et al. | July 23, 1946 |
| 2,553,958 | Chelminski et al. | May 22, 1951 |
| 2,566,988 | Kolb | Sept. 4, 1951 |
| 2,585,006 | Graner et al. | Feb. 12, 1952 |
| 2,588,115 | Hines | Mar. 4, 1952 |
| 2,596,363 | Breguet | May 13, 1952 |